United States Patent
Kim et al.

(10) Patent No.: US 8,098,868 B2
(45) Date of Patent: Jan. 17, 2012

(54) SPEAKER DEVICE FOR PORTABLE TERMINAL

(75) Inventors: Bong-Sub Kim, Gyeongsangnam-do (KR); Yong-Yi Kim, Gumi-si (KR); Seung-Woo Ryu, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1407 days.

(21) Appl. No.: 11/652,068

(22) Filed: Jan. 11, 2007

(65) Prior Publication Data

US 2008/0069384 A1    Mar. 20, 2008

(30) Foreign Application Priority Data

Sep. 18, 2006    (KR) .................. 10-2006-0090187

(51) Int. Cl.
*H04R 1/02* (2006.01)

(52) U.S. Cl. ..... 381/351; 381/345; 381/338; 379/433.02

(58) Field of Classification Search .......... 381/337–338; 379/413.13, 433.02, 420.01–420.02, 433.13; 455/569.1–570

See application file for complete search history.

(56) References Cited

U.S. PATENT DOCUMENTS

| | | | | |
|---|---|---|---|---|
| 5,963,640 A * | 10/1999 | Rabe | ................. | 379/433.02 |
| 6,035,211 A * | 3/2000 | Rabe et al. | ................. | 455/567 |
| 6,349,225 B1 * | 2/2002 | Lands et al. | ................. | 455/575.3 |
| 7,092,745 B1 * | 8/2006 | D'Souza | ................. | 455/575.1 |
| 7,280,666 B2 * | 10/2007 | Guyot et al. | ................. | 381/351 |
| 7,415,290 B2 * | 8/2008 | Murray et al. | ................. | 455/569.1 |
| 7,747,004 B2 * | 6/2010 | Lewis et al. | ................. | 379/433.13 |
| 7,961,900 B2 * | 6/2011 | Zurek et al. | ................. | 381/354 |
| 2002/0022216 A1 * | 2/2002 | Kraus et al. | ................. | 435/2 |
| 2005/0201550 A1 * | 9/2005 | Yang et al. | ................. | 379/433.02 |

FOREIGN PATENT DOCUMENTS

| | | |
|---|---|---|
| JP | 2003018267 A | 1/2003 |
| JP | 2003-219005 | 7/2003 |
| JP | 10-2005-0054501 A | 6/2005 |
| KR | 10-2004-0012263 | 2/2004 |
| KR | 10-2006-0034355 A | 4/2006 |
| KR | 10-2006-0060410 A | 6/2006 |

* cited by examiner

*Primary Examiner* — Curtis Kuntz
*Assistant Examiner* — Ryan Robinson
(74) *Attorney, Agent, or Firm* — Roylance, Abrams, Berdo & Goodman, L.L.P.

(57) ABSTRACT

A speaker device for a portable terminal including a first housing and a second housing coupled to the first housing and rotating towards or away from the first housing while facing the first housing. The speaker device includes a speaker unit mounted in the second housing, first sound output holes formed in the second housing, and second sound output holes formed in the first housing. When the second housing is folded to the first housing, a sound output from the speaker unit is guided into the first housing through the first sound output holes, travels inside the first housing and is output through the second sound output holes. In the speaker device for the portable terminal, the speaker unit and the resonating space are separately positioned in the housings, thereby providing a mellow volume and a high-quality sound and contributing to slimness of the portable terminal.

13 Claims, 4 Drawing Sheets

SPEAKER DEVICE FOR PORTABLE TERMINAL

CROSS-REFERENCE TO RELATED APPLICATION

This application claims the benefit under 35 U.S.C. §119 (a) of Korean Patent Application Serial No. 2006-90187, filed on Sep. 18, 2006, in the Korean Intellectual Property Office, the entire disclosure of which is hereby incorporated by reference.

BACKGROUND OF THE INVENTION

1. Field of the Invention

The present invention relates to a portable terminal such as Digital Multimedia Broadcasting (DMB) phones, game phones, chatting phones, camera phones, MPEG-1 Audio Layer 3 (MP3) phones, cellular phones, Personal Communication Service (PCS) phones, and Hand Held Phones (HHPs) and in particular, to a speaker device for a slim portable terminal.

2. Description of the Related Art

A portable terminal refers to an electronic apparatus which a user can carry with him/her to perform wireless communication with a desired partner. In consideration of portability, designs of such portable communication apparatuses have been developed to emphasize not only compactness, slimness, excellent gripping property, and lightness, but also multimedia availability, thus having a wider variety of functions.

Conventional portable terminals may be classified into various types according to their appearance, such as bar-type portable terminals, flip-type portable terminals, and folder-type portable terminals. The bar-type portable terminal has a single housing shaped like a bar. The flip-type portable terminal has a flip which is pivotably mounted to a bar-shaped housing by a hinge unit. The folder-type portable terminal has a folder coupled to a single bar-shaped housing by a hinge unit in such a manner that the folder can be rotated in order to be folded to or unfolded from the housing. Further, portable terminals may be classified into neck wearable type portable terminals and wrist wearable type portable terminals according to the position at or the way in which a user puts on the portable terminals.

Additionally, portable terminals may be classified into rotation-type portable terminals and sliding-type portable terminals according to ways of opening and closing the portable terminals. In the rotation-type portable terminal, two housings are coupled to each other in such a manner that one housing rotates to be opened or closed relative to the other while the housings face each other. In the sliding-type portable terminal, two housings are coupled to each other in a manner that one housing slides to be opened or closed relative to the other. These variously classified portable terminals can be easily understood by those skilled in the art.

Conventional portable terminals are now capable of transmitting data at a high speed in addition to the basic function of performing voice communication. In other words, according to increasing demand by consumers, portable terminals now provide a service using a wireless communication technology capable of transmitting data at a high speed, for example, a multimedia service like transmission of moving pictures.

Research on miniaturization of the portable terminal has been conducted in consideration of portability of the portable terminal, but the miniaturization has been hampered by an increase in the size of a display device due to a multimedia service. As a result, manufacturers of portable terminals have made an effort to reduce the thickness of the portable terminal.

Although a high-quality sound is essential to use a multimedia service, there are many difficulties in providing the high-quality sound in a slim portable terminal. In other words, since a slim portable terminal cannot secure a resonating space for a sound output from a speaker unit due to its narrow internal space, it is difficult to implement a mellow volume and a sound in a bass region.

Accordingly, there is a need for an improved speaker device for providing high-quality sound in a slim portable terminal.

SUMMARY OF THE INVENTION

An aspect of exemplary embodiments of the present invention is to address at least the above problems and/or disadvantages and to provide at least the advantages described below. Accordingly, an aspect of exemplary embodiments of the present is invention is to provide a speaker device for a portable terminal which can easily secure a resonating space in a slim portable terminal.

An aspect of exemplary embodiments of the present invention provides a speaker device for a portable terminal which can improve the quality of a sound output from a portable terminal by securing a resonating space in a slim portable terminal.

An aspect of exemplary embodiments of the present invention also provides a speaker device for a portable terminal in which a housing in which a speaker unit is mounted and a housing in which a resonating space is provided are separately provided in a folder-type portable terminal to disperse mounting spaces of parts, thereby contributing to slimness of a portable terminal.

According to an aspect of exemplary embodiments of the present invention, there is provided a speaker device for a portable terminal including a first housing and a second housing coupled to the first housing and rotating towards or away from the first housing while facing the first housing. The speaker device includes a speaker unit mounted in the second housing, first sound output holes formed in the second housing, and second sound output holes formed in the first housing. When the second housing is folded to the first housing, a sound output from the speaker unit is guided into the first housing through the first sound output holes, travels inside the first housing, and is output through the second sound output holes.

According to an aspect of exemplary embodiments of the present invention, there is provided a speaker device for a portable terminal including a first housing and a second housing that is coupled to the first housing in such a way as to be foldable to the first housing. The speaker device includes a speaker unit mounted in one of the first housing and the second housing and a resonating space provided inside the other of the first housing and the second housing in which, when the second housing is folded to the first housing, a sound output from the speaker unit is output to the outside via the resonating space.

BRIEF DESCRIPTION OF THE DRAWINGS

The above and other objects, features and advantages of certain exemplary embodiments of the present invention will be more apparent from the following detailed description taken in conjunction with the accompanying drawings in which.

DETAILED DESCRIPTION OF THE PREFERRED EMBODIMENT

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
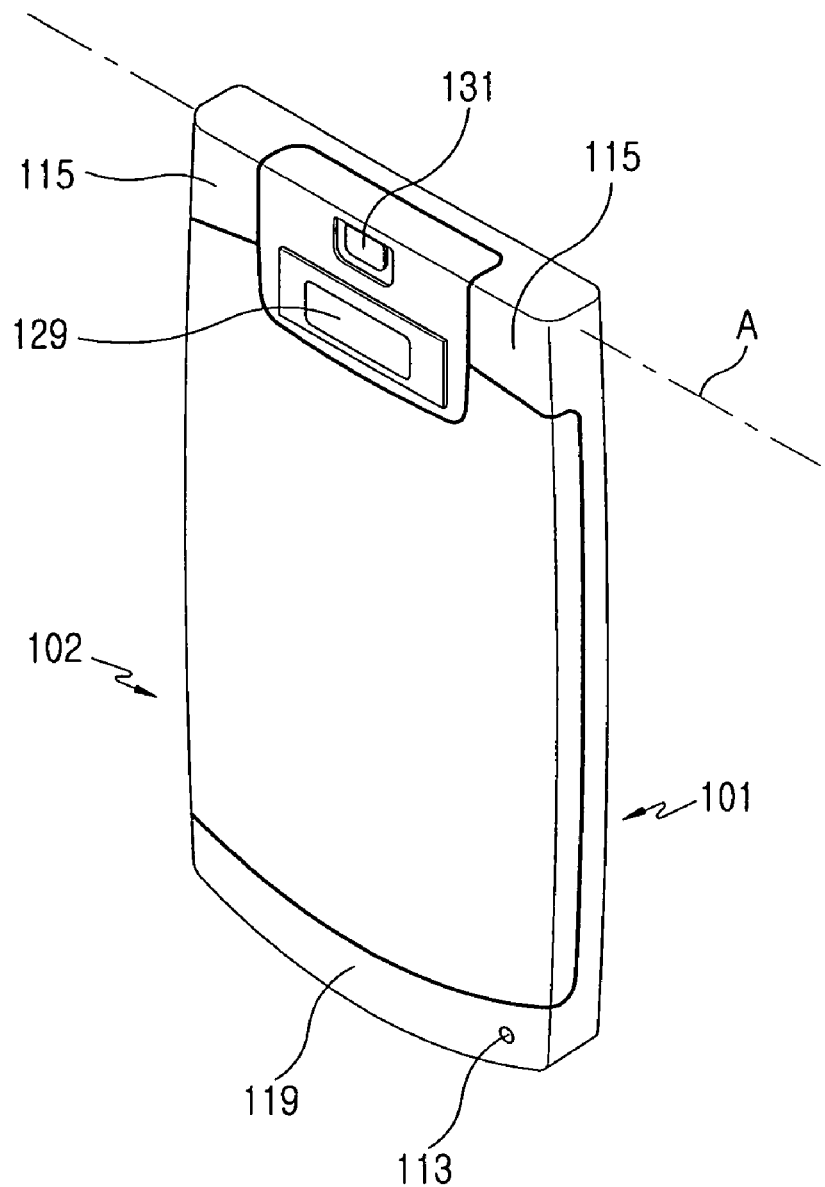
FIG. 1 is a perspective view of a portable terminal having a speaker device according to an exemplary embodiment of the present invention.
Figure 2:
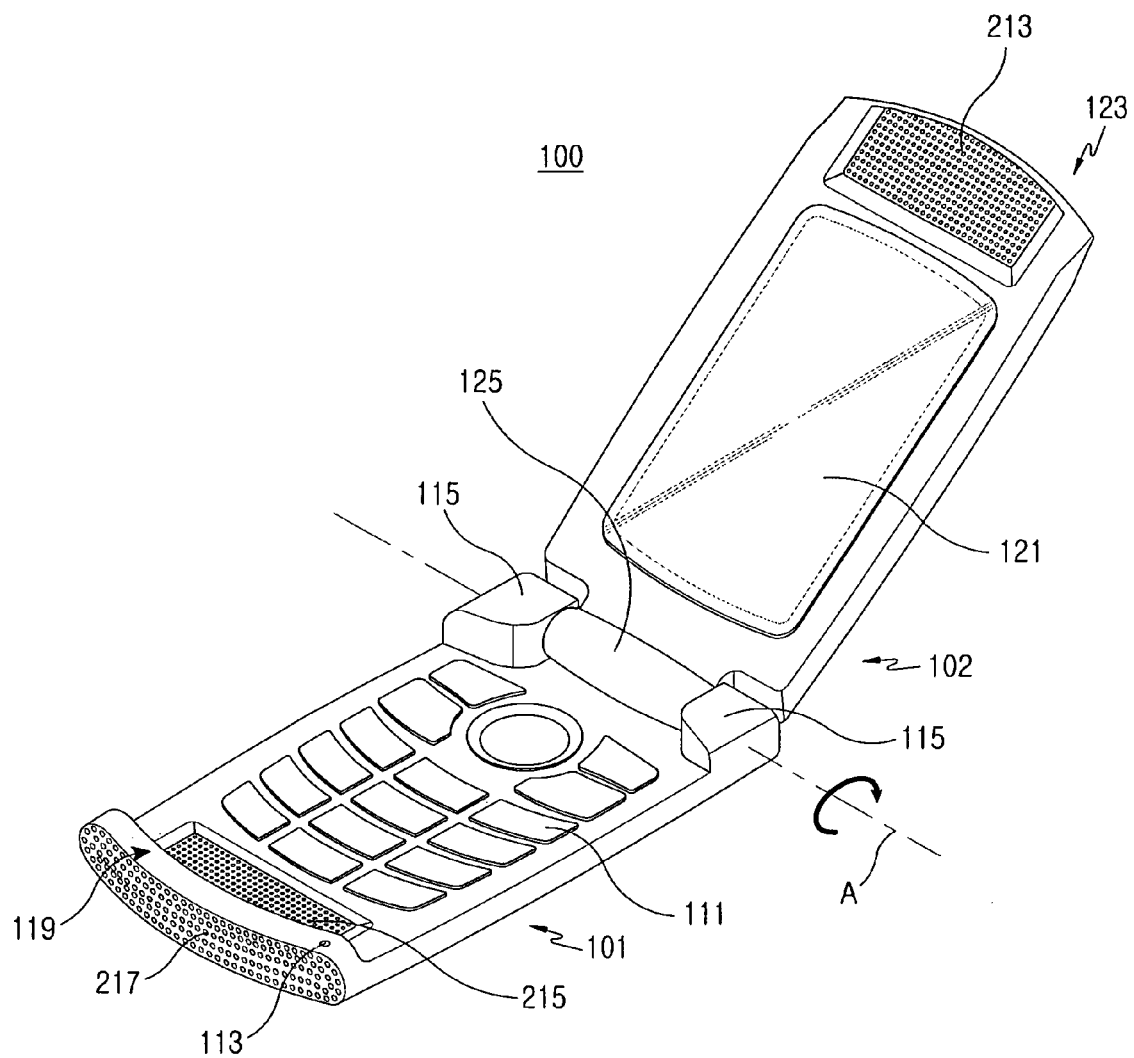
FIG. 2 is a perspective view showing a state where a portable terminal shown in FIG. 1 is opened.

As shown in FIGS. 1 and 2, in an exemplary embodiment, a portable terminal 100 having a speaker device according to a preferred embodiment of the present invention includes a first housing 101 and a second housing 102 that is rotatably coupled to the first housing 101. The second housing 102 rotates towards or away from the first housing 101.

The first housing 101 includes a protrusion 119 at one end of its inner side facing the second housing 102 and a pair of side hinge arms 115 at the other end. The side hinge arms 115 are positioned at both ends of the first housing 101 to face each other and provide a means for coupling the first housing 101 to the second housing 102.

A keypad 111 is installed between the protrusion 119 and the side hinge arms 115 and is opened or closed by rotation of the second housing 102. A transmitting unit (or a mouthpiece) 113 having embedded therein a microphone device is installed on the protrusion 119.

The second housing 102 includes a main display device 121 and a receiving unit (or an earpiece) 123 that are installed in its inner side facing the first housing 101. The receiving unit 123 is positioned adjacent to one end of the second housing 102, and becomes adjacent to the protrusion 119 when the second housing 102 is folded to the first housing 101.

A camera lens 131 is installed in the outer side of the second housing 102 to photograph an object and an auxiliary display device 129 is installed adjacent to the camera lens 131. If a flash device is installed instead of the auxiliary display device 129, illumination can be provided for photographing in a dark environment.

The second housing 102 includes a center hinge arm 125 at its other end to be rotatably coupled to the first housing 101. The center hinge arm 125 provides a hinge axis A by being rotatably coupled between the side hinge arms 115 and the second housing 102 rotates with respect to the hinge axis A. As the second housing 102 rotates on the first housing 101, the keypad 111, the main display device 121, and the receiving unit 123 are opened or closed.

Figure 3:
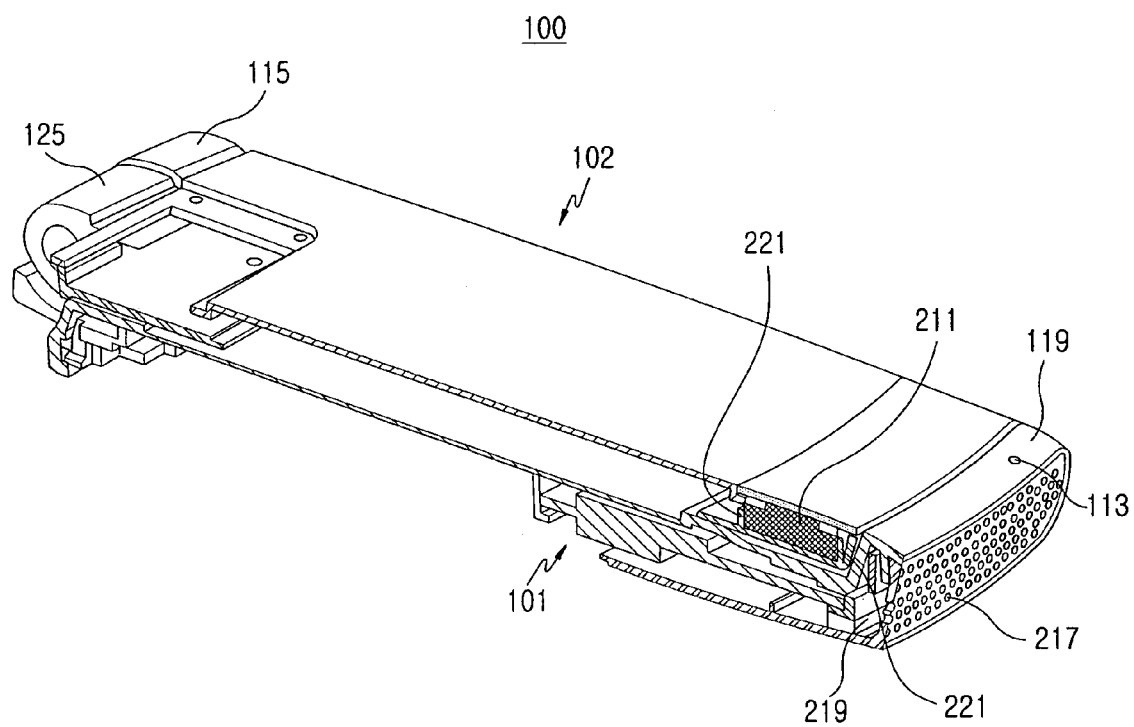
FIG. 3 is a cut perspective view of a portable terminal shown in FIG. 1.
Figure 4:
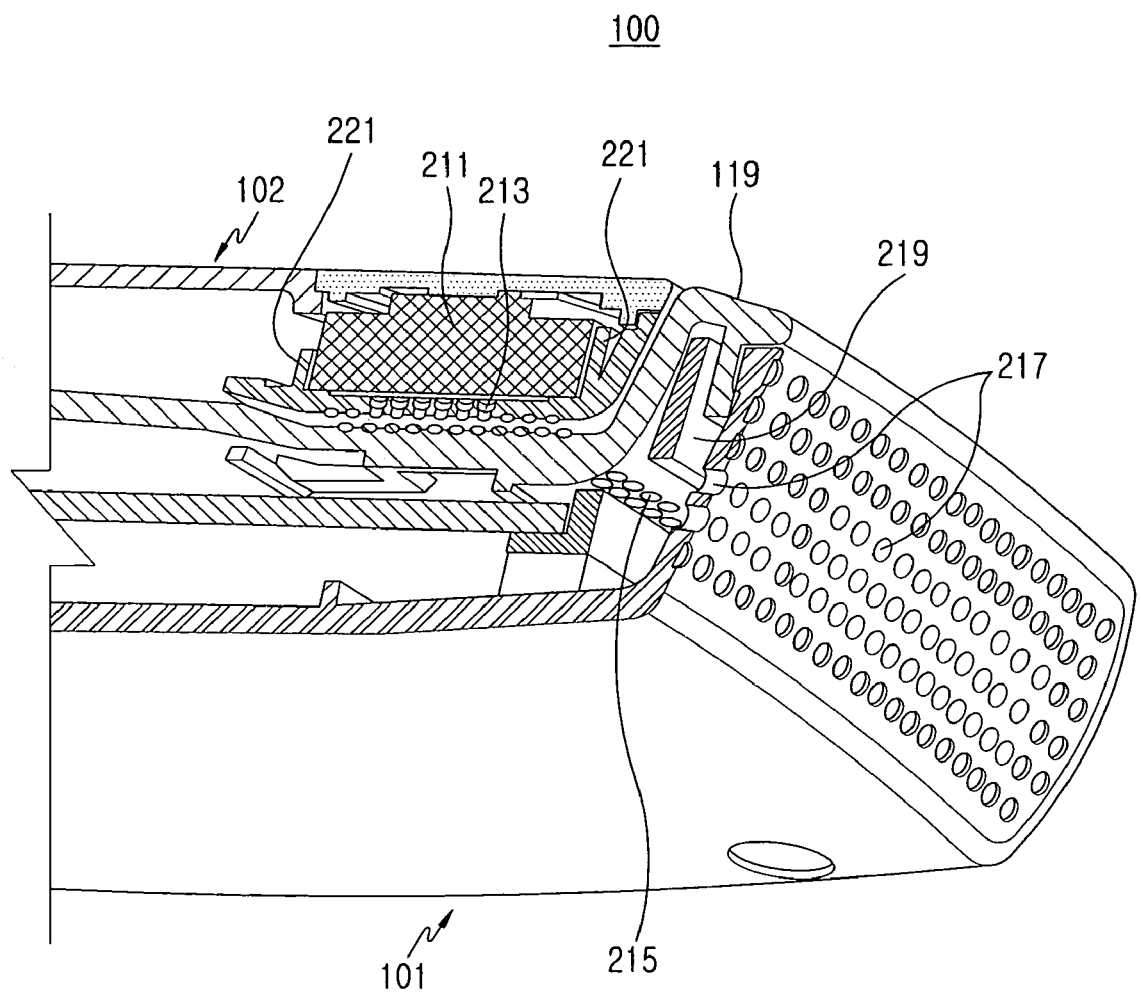
FIG. 4 is a cut perspective view of a speaker device of a portable terminal shown in FIG. 1.

Referring to FIGS. 3 and 4, in an exemplary embodiment, the speaker device of the portable terminal 100 includes a speaker unit 211 installed in the second housing 102 and a resonating space 219 provided in the first housing 101. The speaker unit 211 is positioned in the receiving unit 123 to output the partner's voice during voice communication.

To mount the speaker unit 211, a fixing rib 221 is formed in the second housing 102 in such a way to surround the outer circumferential face of the speaker unit 211. A plurality of first sound output holes 213 are formed in the inner side of one end of the second housing 102 to output a sound from the speaker unit 211 to the outside. The first sound output holes 213 are formed in a region surrounded by the fixing rib 221.

When the second housing 102 rotates away from the first housing 101 to open the portable terminal 100, the first sound output holes 213 may output the partner's voice as a part of the receiving unit 123. When the second housing 102 is folded to the first housing 101, the first sound output holes 213 face the inner side of the first housing 101 and one end face of the second housing 102 is surrounded by the protrusion 119.

At this time, the protrusion 119 appears to surround one end face of the second housing 102 because its inner side has a hollow shape. If the inner side of the protrusion 119 and one end face of the second housing 102 have flat shapes, they may face each other.

The resonating space 219 is formed inside the first housing 101 and in an exemplary embodiment of the present invention, is formed inside the protrusion 119. When a music file is reproduced in a state where the first housing 101 and the second housing 102 are folded together, a sound output from the speaker unit 211 is output to the outside via the resonating space 219. The sound output via the resonating space 219 can have a more mellow volume than a sound output without passing through the resonating space 219 and a sound in a bass region lower than 1 kHz can be improved.

Table 1 shows a comparison between the sound pressure of a sound generated from the speaker unit 211 and output without passing through the resonating space 219 and the sound pressure of the generated sound that is output via the resonating space 219. The sound pressure is expressed in a dB unit.

TABLE 1

| Sound that is output without passing through resonating space | | | Sound that is output via resonating space | | |
|---|---|---|---|---|---|
| Leq | L10 | Lmax | Leq | L10 | Lmax |
| 55.5 | 59.9 | 63.3 | 64.4 | 68.7 | 72.6 |
| 54.4 | 56.3 | 57.6 | 62.9 | 65.4 | 66.9 |
| 53.1 | 57.3 | 63.7 | 63.3 | 66.9 | 71.7 |
| 57.2 | 61.2 | 63.2 | 68.6 | 72.5 | 74.1 |
| 59.3 | 62.3 | 68.1 | 67.1 | 70.4 | 76.0 |

Leq indicates the average of sound pressures of output sounds to be measured, L10 indicates a sound pressure corresponding to Level 10 from the maximum sound pressure when a difference between the maximum sound pressure and the minimum sound pressure is classified into 100 levels, and Lmax indicates the maximum sound pressure to be measured.

As shown in Table 1, the sound pressure of the sound that is output via the resonating space 219 is improved by 10 dB when compared to that of the sound that is output without passing through the resonating space 219. Through the resonating space 219, a sound in a bass region is improved, thereby improving sound quality of the portable terminal 100.

To input the sound generated from the speaker unit 211 to the resonating space 219, sound input holes 215 are formed in the first housing 101. To output the sound passing through the resonating space 219 to the outside, second sound output holes 217 are formed in the first housing 101.

The sound input holes 215 are formed adjacent to the protrusion 119 in one end of the first housing 101 and are opened or closed by rotation of the second housing 102. In other words, when the second housing 102 is folded to the first housing 101, the sound input holes 215 are closed by the second housing 102. At this time, the first sound output holes 213 are connected to the sound input holes 215 and the sound output from the speaker unit 211 is input to the resonating space 219 by the first sound output holes 213 and the sound input holes 215.

Since the protrusion 119 is provided to surround one end face of the second housing 102, the sound output from the speaker unit 211 can be prevented from flowing out between the first housing 101 and the second housing 102. Moreover, a portion in which the first sound output holes 213 are formed protrudes and a portion in which the sound input holes 215 are formed has a recess shape to accommodate the portion in which the first sound output holes 213 are formed, thereby preventing the outflow of the sound output from the speaker unit 211 and inputting the output sound to the resonating space 219.

The resonating space 219 is separated from the other portion in the first housing 101 and the sound input to the resonating space 219 is output to the outside through the second sound output holes 217.

The second sound output holes 217 are formed in one end face of the first housing 101, more specifically, in the outer side of the protrusion 119 to be exposed at all times. At this time, for a sufficient resonating effect of the sound output from the speaker unit 211 in the resonating space 219, a path from the sound input holes 215 to the second sound output holes 217 is formed across the resonating space 219. Thus, the sound input to the resonating space 219 can be output to the outside after getting a sufficient resonating effect.

When the first housing 101 and the second housing 102 are folded together, the sound output from the speaker unit 211 travels inside the first housing 101 to get a resonating effect and then is output to the outside, thereby acquiring a mellow volume and enriched sound in a bass region.

As described above, when the speaker device according to the present invention is installed in the portable terminal in which a pair of housings are unfolded from a folded state, the speaker unit and the resonating space are dispersed over the housings and the sound output from the speaker unit is input to the resonating space when the housings are folded together, thereby contributing to slimness of the portable terminal. Moreover, since the speaker device and the resonating space are separately disposed in the housings, users can enjoy a mellow volume and a high-quality sound with a slim portable terminal.

While the invention has been shown and described with reference to a certain embodiments thereof, it will be understood by those skilled in the art that various changes in form and details may be made therein without departing from the spirit and scope of the invention.

For example, although the structure of a speaker device applied to a folder-type terminal is described in an exemplary embodiment of the present invention, the speaker device may also be applied to portable terminals of which a pair of housings are folded together for carrying and which are opened or closed by sliding or swing-rotation. In other words, the speaker unit 211 is installed in one of the housings and the resonating space 219 is provided in the other housing. Thus, when the housings are folded together, the sound output from the speaker unit 211 can be output via the resonating space 219 provided in the other housing.

In addition, the speaker unit 211 is provided in the second housing 102 and the resonating space 219 is provided in the first housing 101 in an exemplary embodiment of the present invention, however, the speaker unit 211 may be installed in the first housing 101. If the speaker unit 211 is installed in a portion where it cannot serve as a receiving unit, an additional speaker unit should be installed in the receiving unit

What is claimed is:

1. A speaker device for a portable terminal including a first housing and a second housing coupled to the first housing and rotating toward or away from the first housing while facing the first housing, the speaker device comprising:
   a speaker unit mounted in the second housing;
   first sound output holes formed in the second housing; and
   second sound output holes formed in the first housing,
   wherein when the second housing is folded to the first housing, a sound output from the speaker unit is guided into the first housing through the first sound output holes, travels inside the first housing, and is output through the second sound output holes, and when the second housing rotates away from the first housing to open the portable terminal, the first sound output holes output a sound as a part of a receiving unit of the portable terminal.

2. The speaker device of claim 1, wherein the first sound output holes are formed in one end of the inner side of the second housing facing the first housing and the second sound output holes are formed in one end face of the first housing.

3. The speaker device of claim 1, further comprising sound input holes formed in the first housing, wherein when the second housing is folded to the first housing, the first sound output holes are connected to the sound input holes.

4. The speaker device of claim 3, wherein the first sound output holes are formed in one end of the inner side of the second housing facing the first housing and the sound input holes are formed adjacent to the second sound output holes in one end of the inner side of the first housing facing the second housing.

5. The speaker device of claim 4, wherein a resonating space is formed in the first housing between the sound input holes and the second sound output holes and a sound output from the speaker unit is input to the resonating space through the first sound output holes and the sound input holes.

6. The speaker device of claim 1, further comprising a fixing rib formed in the inner circumferential face of the second housing and surrounding the outer circumferential face of the speaker unit, wherein the first sound output holes are formed in a region surrounded by the fixing rib.

7. The speaker device of claim 1, further comprising:
   a protrusion formed in one end of the first housing; and
   sound input holes formed adjacent to the protrusion in the inner side of the first housing, wherein when the second housing is folded to the first housing, one end face of the second housing is surrounded by the protrusion and the first sound output holes are connected to the sound input holes.

8. The speaker device of claim 7, further comprising a resonating space formed in the protrusion, wherein a sound input through the sound input holes is output through the second sound output holes via the resonating space.

9. A speaker device for a portable terminal including a first housing and a second housing that is coupled to the first housing in such a way as to be foldable to the first housing, the speaker device comprising:
   a speaker unit mounted in one end of one of the first housing and the second housing;

a resonating space provided in one end of inside the other of the first housing and the second housing; and a plurality of first sound output holes formed in one of the first housing and the second housing to provide a path for the sound output from the speaker unit; and a plurality of sound input holes formed in the other of the first housing and the second housing to guide the sound passing through the first sound output holes to the resonating space, wherein when the first housing and the second housing are folded together, the first sound output holes and the sound input holes are connected to each other, and wherein when the second housing is folded to the first housing, the speaker unit and the resonating space become adjacent to each other, and a sound output from the speaker unit is output to the outside via the resonating space.

10. The speaker device of claim 9, further comprising second sound output holes formed in the other of the first housing and the second housing, wherein the sound input to the resonating space after passing through the sound input holes is output to the outside through the second sound output holes.

11. The speaker device of claim 10, further comprising a protrusion formed in one end of the other of the first housing and the second housing, wherein the resonating space is installed in the protrusion.

12. The speaker device of claim 11, wherein when the first housing and the second housing are folded together, the protrusion is positioned to surround one end face of one of the first housing and the second housing.

13. The speaker device of claim 11, wherein the sound input holes are formed adjacent to the protrusion and the second sound output holes are formed in the outer side of the protrusion.

* * * * *